United States Patent [19]

Enomoto

[11] Patent Number: 5,287,795
[45] Date of Patent: Feb. 22, 1994

[54] COFFEE MAKER

[76] Inventor: Kazuo Enomoto, 7-1-5 Sumiyoshi-miyacho, Higashinada, Kobe, Hyogo 658, Japan

[21] Appl. No.: 986,363

[22] Filed: Dec. 7, 1992

[30] Foreign Application Priority Data

Dec. 11, 1991 [JP] Japan .................................. 3-351442

[51] Int. Cl.$^5$ .................................................. A47J 31/42
[52] U.S. Cl. .......................................... 99/280; 99/286; 241/65; 241/101.2
[58] Field of Search ................... 99/286, 290, 295, 300, 99/304, 305, 306, 307, 302, 280; 426/433; 241/101.2, 65

[56] References Cited

U.S. PATENT DOCUMENTS

| | | | |
|---|---|---|---|
| 4,172,413 | 10/1979 | Roseberry | 99/286 |
| 4,459,524 | 7/1984 | Oota | 99/286 |
| 4,555,984 | 12/1985 | Yamashita | 99/286 |
| 4,644,571 | 2/1987 | Narita | 99/286 |
| 4,895,308 | 1/1990 | Tanaka . | |
| 5,083,502 | 1/1992 | Enomoto . | |

FOREIGN PATENT DOCUMENTS

| | | |
|---|---|---|
| 35-18243 | 6/1956 | Japan . |
| 3-16128 | 7/1989 | Japan . |
| 1-190317 | 7/1989 | Japan . |
| 1-190318 | 7/1989 | Japan . |
| 2-237519 | 9/1990 | Japan . |
| 3-251212 | 11/1991 | Japan . |
| 4-40916 | 2/1992 | Japan . |
| 4-224719 | 8/1992 | Japan . |

Primary Examiner—Robert W. Jenkins
Attorney, Agent, or Firm—Marshall, O'Toole, Gerstein, Murray & Borun

[57] ABSTRACT

This disclosure relates to a coffee maker for performing the appropriate automatic operation in accordance with whether or not there are coffee beans contained in the apparatus, informing the user of the type of automatic operation which is possible to perform at the present time, and, in the event that the user has not completed all of the necessary preparations for operation, preventing the occurrence of useless operation and dangerous operating conditions by automatically stopping operation at the point just before the step for which the preparations have not been completed. The coffee maker includes a temporary holding and cooling means provided with a sensor for detecting remaining coffee beans, and a controller begins the first automatic subprocess operation starting from the roasting of the raw coffee beans by the roaster if this sensor for detecting remaining coffee beans does not detect any coffee beans, and also so that it begins the second automatic subprocess operation starting from the grinding of the beans by the grinding means if coffee beans are detected.

5 Claims, 10 Drawing Sheets

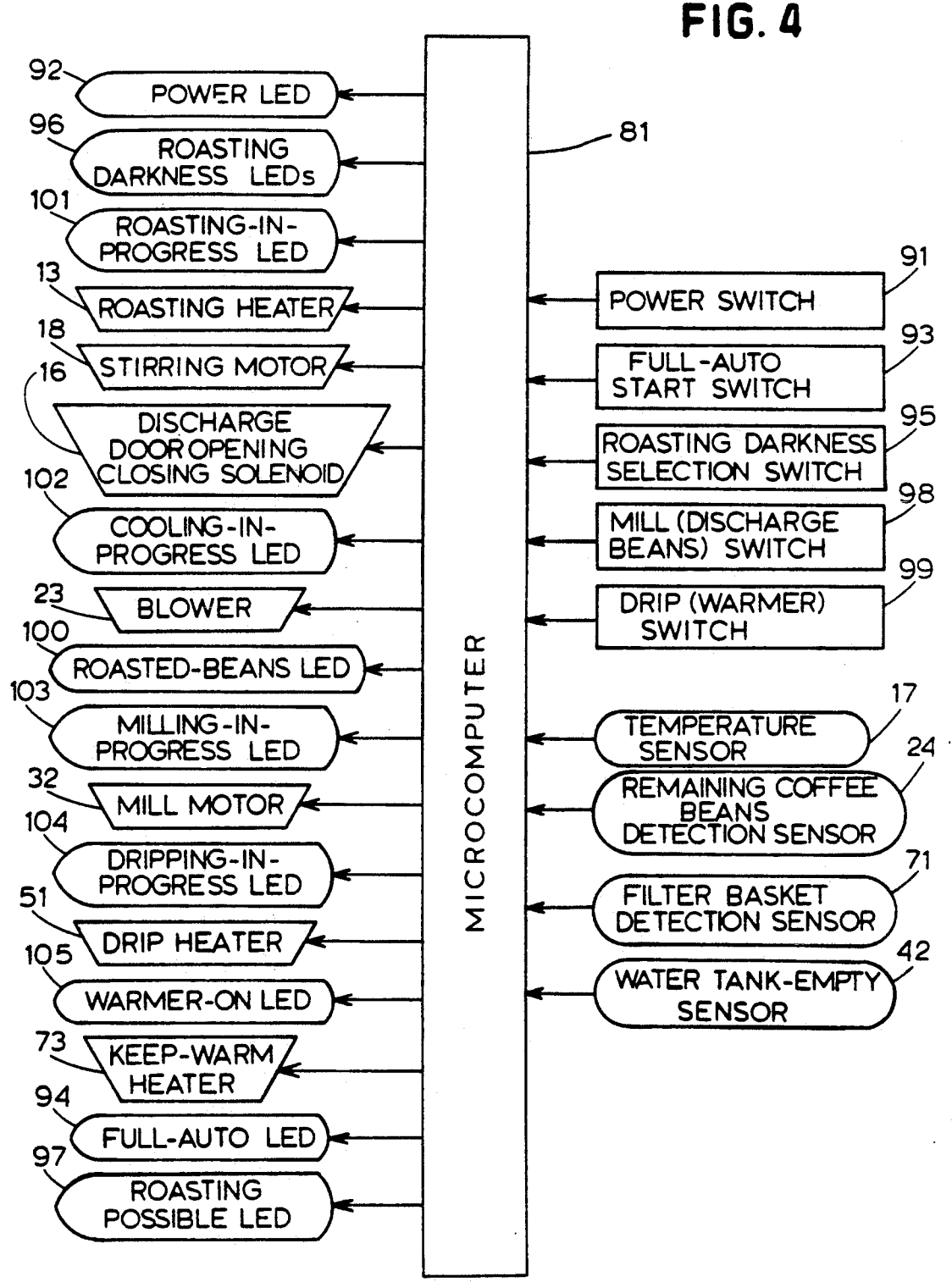

5,287,795

COFFEE MAKER

FIELD AND BACKGROUND OF THE INVENTION

This invention relates to an automatic coffee maker capable of providing coffee from raw coffee beans through a process of roasting, grinding, and brewing.

The present inventor has previously proposed coffee makers capable of providing coffee completely automatically from raw coffee beans, as described in Japanese Patent early publication Hei. 2-237,519 dated Sep. 20, 1990, early publication Hei. 3-251,212 dated Nov. 8, 1991, and early publication Hei. 4-40916 dated Feb. 12, 1992. With these coffee makers, the raw coffee beans were roasted, cooled, ground, and then the coffee was brewed in a serial type process or procedure, and the next operation could not begin until this serial procedure had been completed. In contrast, with the fully automatic coffee maker proposed in Japanese Patent early Application Hei. 4-224719 dated Aug. 14, 1992, by providing a temporary holding tank for cooling and temporarily holding the roasted coffee beans, it became possible to perform the subprocess consisting of roasting through cooling and holding simultaneously and in parallel with the subprocess consisting of grinding through brewing.

However, even with the coffee maker in Japanese Patent early publication Hei. 4,224719 referred to above, the selection between either the subprocess comprised of roasting through cooling and holding or the subprocess comprised of grinding through brewing was left to the judgment of the user, with the coffee maker itself not having the capabability of automatically making the selection. In addition, it was not indicated to the user whether the procedure performed by the start of operation was the subprocess beginning from roasting or the subprocess beginning from grinding. Thus, operation was not very convenient. Moreover, in such cases as when the brewing means had not been secured in position or the water for the hot water supply had not been prepared, the judgment to stop operation already in progress was not made with sufficient accuracy and reliability.

Thus, a primary objective of this invention is to avoid the problems of the prior art described above by providing a coffee maker which is capable of performing the appropriate automatic operation by sensing whether or not there are coffee beans contained in the apparatus, which is also capable of informing the user of the type of automatic operation that is possible to perform at the present time, and which, in the event that the user has not completed all of the necessary preparations for operation, is also capable of preventing the occurrence of useless operation and dangerous operating conditions by automatically stopping operation at the point just before the step for which the preparations have not been completed.

SUMMARY OF THE INVENTION

A coffee maker in accordance with this invention comprises a roaster which roasts raw coffee beans, a temporary holding and cooling means which temporarily holds and fan cools the coffee beans roasted by the roaster, a grinding means which grinds the beans from the temporary holding and cooling means and supplies the ground coffee, a water heating and supply means which heats and supplies the water from a water tank, a brewing means which collects the ground coffee beans ground by the grinding means and the hot water from the water heating and supply means and brews the coffee, and a microcomputer-equipped controller. The coffee maker has the capabability of performing all of the process steps from the roasting of the raw coffee beans to the brewing of the coffee completely automatically, and a primary feature of the coffee maker according to this invention is that the temporary holding and cooling means is provided with a sensor for detecting remaining coffee beans, and the controller begins the first automatic subprocess starting from the roasting of the raw coffee beans by the roaster if this sensor does not detect any coffee beans, and also so that it begins the second automatic subprocess starting from the grinding of the beans by the grinding means if coffee beans are detected.

In addition to the first feature described above, a second feature of the coffee maker of this invention is that the controller is comprised such that, when coffee beans are detected by the sensor for detecting remaining coffee beans, the controller displays on the control panel an indication that there are roasted beans in the coffee maker and an indication that the second automatic subprocess is possible, and also so that, when coffee beans are not detected, it displays on the control panel an indication that roasting is possible and an indication that the first automatic subprocess is possible.

In addition to the first and second features described above, a third feature of the coffee maker of this invention is that the controller is composed so that it becomes possible to re-start the first automatic operation immediately following the start of the grinding of the roasted coffee beans by the grinding means.

In addition to the features described above, a fourth feature of the coffee maker of this invention is that, in addition to the brewing means being freely detachable from the apparatus, a brewing means detection sensor is provided to detect whether or not the brewing means is secured in position and, furthermore, the controller is composed so that the grinding means will not begin operation if this brewing means detection sensor detects that the brewing means is not secured in position.

In addition to the features described above, a fifth feature of the coffee maker of this invention is that a tank-empty sensor is provided to detect whether or not there is water in the water tank and, furthermore, the controller is composed so that the heater of the water heating and supply means will not be switched on if this tank-empty sensor detects that there is no water in the water tank.

In the operation of the coffee maker, with the first feature of this invention described above, the coffee maker itself automatically judges whether or not there are coffee beans in the temporary holding and cooling means, and if there are none, automatic operation of the subprocess starting from the roasting of the coffee beans by the roaster is begun. If coffee beans are detected, then automatic operation of the subprocess starting from the grinding of the beans by the grinding means is begun. In other words, the coffee maker automatically selects between the subprocess starting from the roasting step or subprocess starting from the grinding step.

With the second feature described above, in addition to the operation provided by the first feature, when coffee beans are detected by the sensor for detecting remaining coffee beans, an indication that there are roasted beans in the coffee maker and an indication that the second automatic subprocess is possible is displayed on the control panel, and, when coffee beans are not detected, an indication that roasting is possible and an indication that the first automatic subprocess is possible, are displayed on the control panel. As a result, these indications provide the user with information concerning the present condition and subsequent operation of the coffee maker, thus making the coffee maker extremely easy to use.

With the third feature described above, in addition to the operation provided by the first or second features, it is possible to re-start the first automatic subprocess immediately following the start of the grinding of the roasted coffee beans by the grinding means. As a result, it is possible to simultaneously perform at least the brewing of the coffee and the roasting of a new batch of raw coffee beans to be used next, thus making it possible to obtain brewed coffee from raw coffee beans with good operational efficiency.

With the fourth feature described above, in addition to the operation provided by the first, second, or third features, the operation of the grinding means will not begin if the brewing means is not secured in position on the coffee maker. In other words, the coffee maker will wait in a standby state just prior to the grinding of the roasted beans, thus preventing the coffee beans from being ground and supplied while the preparation of the brewing means has not been completed.

With the fifth feature described above, in addition to the operation provided by the first, second, third, or fourth features, because the heater of the water heating and supply means will not be switched on if the tank-empty sensor detects that there is no water, empty or waterless heating is prevented, and, in addition, heating is reliably stopped when the supply of the hot water has been completed.

BRIEF DESCRIPTION OF THE DRAWINGS

The invention will be better understood from the following detailed description taken in conjunction with the accompanying figures of the drawings, wherein:

FIG. 4 is a block diagram illustrating the controls performed by a microcomputer of the controller;

DETAILED DESCRIPTION

Figure 1:
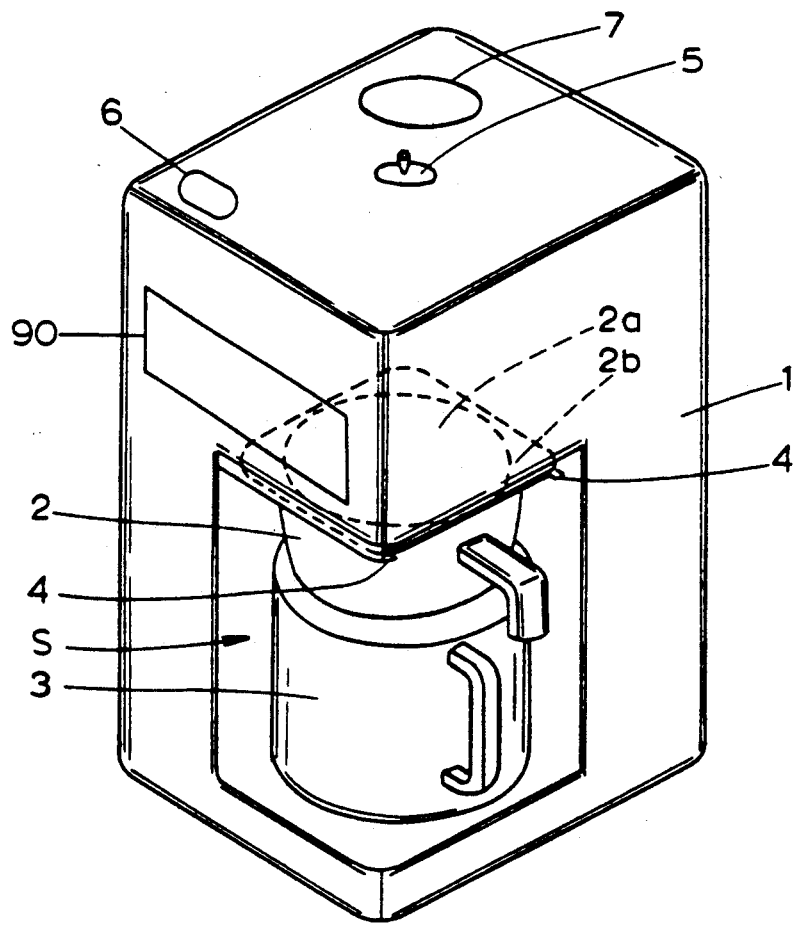
FIG. 1 is an overall perspective view of an embodiment of a coffee maker in accordance with this invention.

With reference first to FIG. 1, inside an outer case 1 are contained all of the major components of the coffee maker with the exception of the filter basket 2, which forms the coffee brewing means, and the decanter 3. The decanter 3 is a container for the purpose of catching the dripped coffee, and it is placed in a decanter placement space S which is formed by shaping a corner of the outer case 1 into a concave shape. In addition, the filter basket 2 is a container-shaped component for the purpose of brewing, filtering, and dripping the coffee, and a filter is placed in a freely removable manner into this filter basket along the inner walls of the basket. For this filter it is possible to use a disposable type such as a paper filter.

On both sides of the ceiling part of the decanter placement space S, supporting guides 4 are provided as a means of securing the filter basket 2. The filter basket 2 is secured by inserting it so that the flanges 2b on the side edges of the opening 2a in the basket rest on the supporting guides 4. In addition, the secured state can be easily released by sliding out the filter basket 2, thus allowing the filter basket 2 to be freely removed.

In the top of the outer case 1 are provided a coffee bean supply opening 5, a water supply opening 6, and an exhaust opening 7 for the roaster 10, which will be described later.

Figure 2:
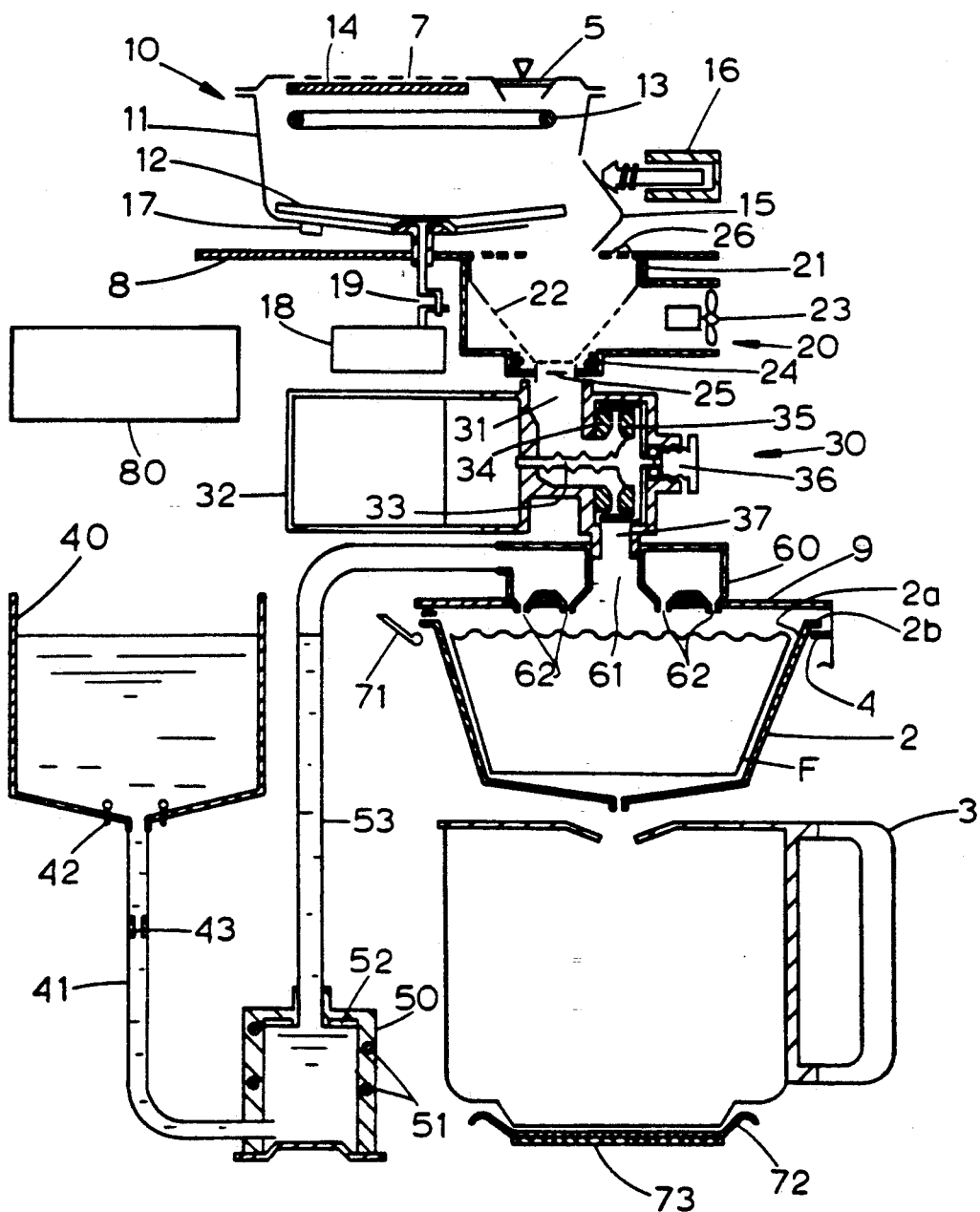
FIG. 2 is a cross-sectional diagrammatic view of the coffee maker.

A roaster 10 (FIG. 2) is provided in the uppermost part inside the outer case 1. This roaster 10 is a device which roasts the raw coffee beans which are placed inside through the opening 5, and it is comprised of an aluminum container 11. Inside this container 11, a stirring blade 12 is provided at the bottom of the container 11, a sheathed heater (roasting heater) 13 for roasting is provided at the upper part of the container 11, and a high temperature catalyst filter 14 for smoke and odor removal is also provided. In addition, a coffee bean discharge door 15 is provided at a section of the bottom of the container 11, and this door is designed so that it can be opened and closed by a solenoid 16. A temperature sensor 17 is also installed on the underside of the bottom of the container 11, and it detects the completion of roasting by means of the temperature at the underside of the container. A stirring motor 18 turns the stirring blade 12 via an anti-thermal-conduction joint 19. Furthermore, in order to prevent any adverse effects from the radiation of heat from the container 11, which is a source of heat radiation, a radiant heat blocking plate 8 is arranged beneath the container 11, thus isolating the compartment in which the roaster 10 is located from the stirring motor 18, and also from other components such as the cooling means and controller, which will be described later. This radiant heat blocking plate 8, unlike the synthetic resin of the outer case 1, is preferably comprised of iron plate.

Beneath the discharge door 15 of the roaster 10, a holding tank cooler 20 is provided independently as a means of temporarily holding and cooling the roasted coffee beans. This cooler 20 is comprised of a blower case 21, a temporary holding tank 22 located inside the blower case, and a fan blower 23 which draws in and blows air from the outside. The temporary holding tank 22 features a mesh construction for at least its lower half, thus allowing the air blown in by the blower 23 to enter from the lower half of the temporary holding tank 22 and then escape upward. At the bottom of the temporary holding tank 22 are provided an optical sensor 24 for detecting remaining coffee beans and a drop door or shutter 25. Cooling air exhaust holes 26 are provided in the radiant heat blocking plate 8.

A grinder 30 is provided independently beneath the temporary holding tank 22 of the cooler 20 as a means for grinding the coffee beans. This grinder 30 is a mill type grinder. Beneath the coffee bean receiving opening 31 is located a feed screw 33 turned by a motor (mill motor) 32 equipped with a speed reducer, and at the end in the conveying direction of this feed screw 33 is located a mill unit comprised of a revolving mill tooth 35 secured to the end of the feed screw 33 and a stationary mill tooth 34. The coffee beans are ground between the revolving mill tooth 35 and the stationary mill tooth 34. The degree to which the beans are ground may be adjusted by turning an adjustment knob 36 in order to adjust the gap between the revolving mill tooth 35 and the stationary mill tooth 34. Beneath the mill unit is provided a discharge opening 37 for the ground coffee beans.

The means for heating and supplying the water for the brewing of the coffee is comprised of a water tank 40, a vertical boiler 50, and a hot water supplier 60. The water tank 40 collects the water which is poured in through the water supply opening 6, and supplies it from its bottom to the vertical boiler 50 via a water supply pipe 41 which is connected to the bottom of the tank. Although the water tank 40 in this embodiment is a stationary or built-in type, it is also possible for it to be a cassette type capable of being freely inserted and removed. At the bottom of the water tank 40 is provided a tank-empty sensor 42 which detects whether or not there is water in the tank. In addition, by providing a narrow neck 43 partway along the water supply pipe 41, it is possible to prevent the reverse flow of water from the boiler 50, and to effectively cause the water heated by the boiler 50 to flow upward through the hot water supply pipe 53 to the hot water supplier 60. The vertical boiler 50 has a heater 51 embedded inside its peripheral wall, and a steam collector 52 provided at its top. The hot water supply pipe 53 extends vertically from the top of the boiler 50, with its upper end connected to the hot water supplier 60.

The hot water supplier 60 is comprised of a ring-shaped container provided with a through-hole 61 at its center, and in the bottom of the container, multiple hot water drop-supply openings 62 are provided concentrically around the through-hole 61. By fitting the discharge opening 37 of the grinder 30 into the through-hole 61, the through-hole 61 becomes a drop-supply opening 61 for the ground coffee beans. This ground coffee drop supply opening 61 and the hot water drop-supply openings 62 arranged around it face toward the decanter placement space S from the ceiling part 9 of the space S.

A filter basket detection sensor 71 detects whether or not the filter basket 2, which is the coffee brewing means, is secured to the ceiling part 9. F is a paper filter placed inside the filter basket 2. A keep-warm plate 72 is provided at the location in which the decanter 3 is placed, and 73 is a keep-warm heater. A controller 80 is located at a position lower than that of the radiant heat blocking plate 8, and it contains a microcomputer and controls the various components of the coffee maker.

Figure 3:
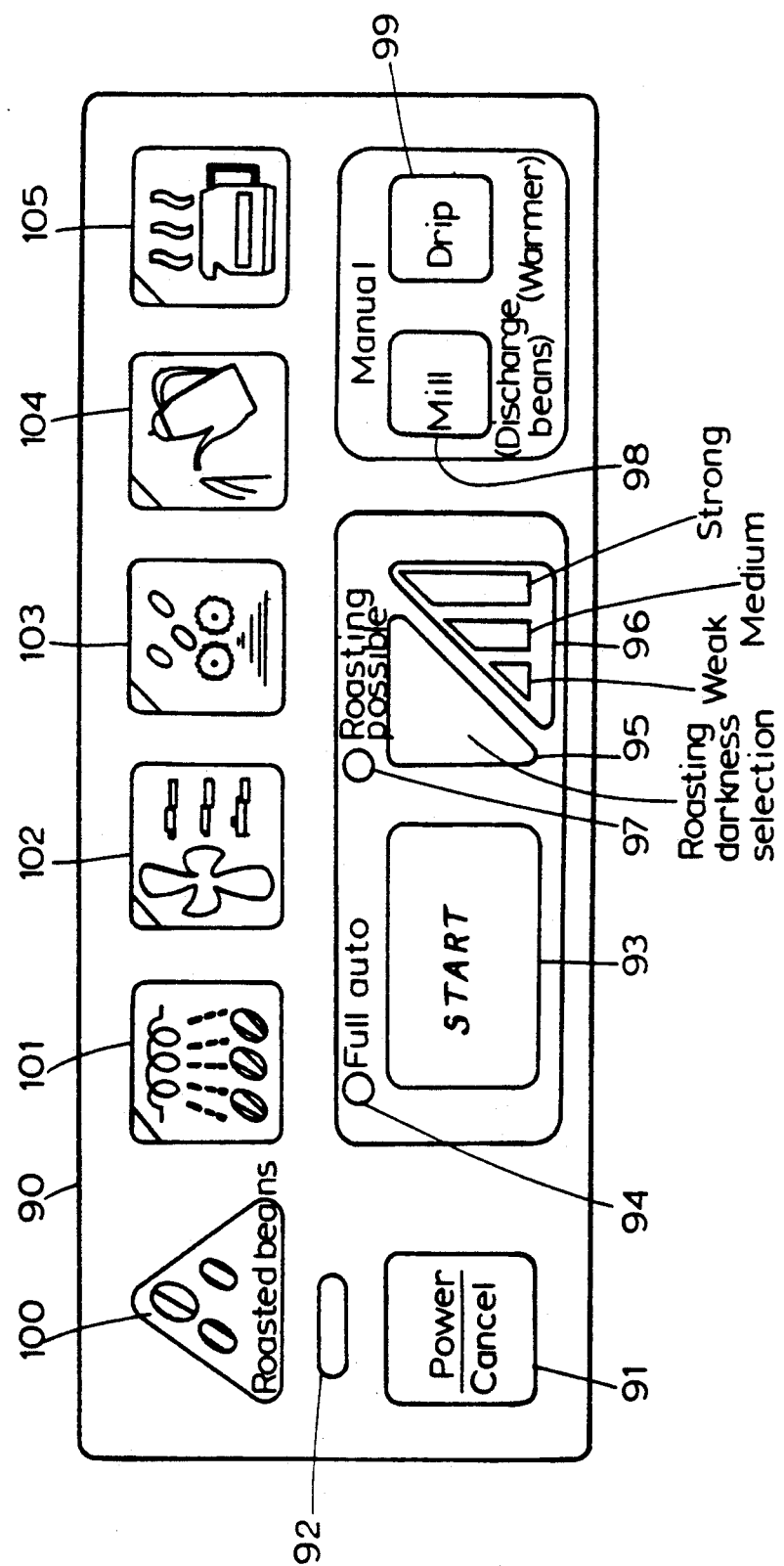
FIG. 3 is a view of the control panel of a controller of the coffee maker.

A control panel 90 for the controller 80 is provided on the outer case 1. As shown in FIG. 3, on this control panel 90 are arranged a power on-off switch 91 which also functions as an operation cancel switch and a power LED 92 which indicates that the power is on, a full-auto start switch 93 and a full-auto LED 94 which indicates the status of the switch, a roasting darkness selection switch 95 and roasting darkness indication LEDs 96 which indicate the selected roasting darkness, a roasting-possible LED 97 which indicates that roasting is possible, a manual mill (grind) switch 98 and a manual drip (brew) switch 99, a roasted-beans LED 100 which indicates that there are roasted coffee beans remaining in the temporary holding tank 22, a roasting-in-progress LED 101, a cooling-in-progress LED 102, a milling-in-progress LED 103, a dripping-in-progress LED 104, and a warmer-on LED 105.

As shown in FIG. 4, the power switch 91, full auto start switch 93, roasting darkness selection switch 95, manual mill switch 98, manual drip switch 99, temperature sensor 17, remaining coffee beans detection sensor 24, filter basket detection sensor 71, and tank-empty sensor 42 are connected to the input terminals of the microcomputer 81 built into the controller 80, and the various LEDs 92, 94, 96, 97, 100, 101, 102, 103, 104, and 105, and also the roasting (sheathed) heater 13, solenoid 16, stirring motor 18, blower 23, mill motor 32, drip heater 51, and keep-warm heater 73 are connected to the output terminals of the microcomputer.

Figure 5A:
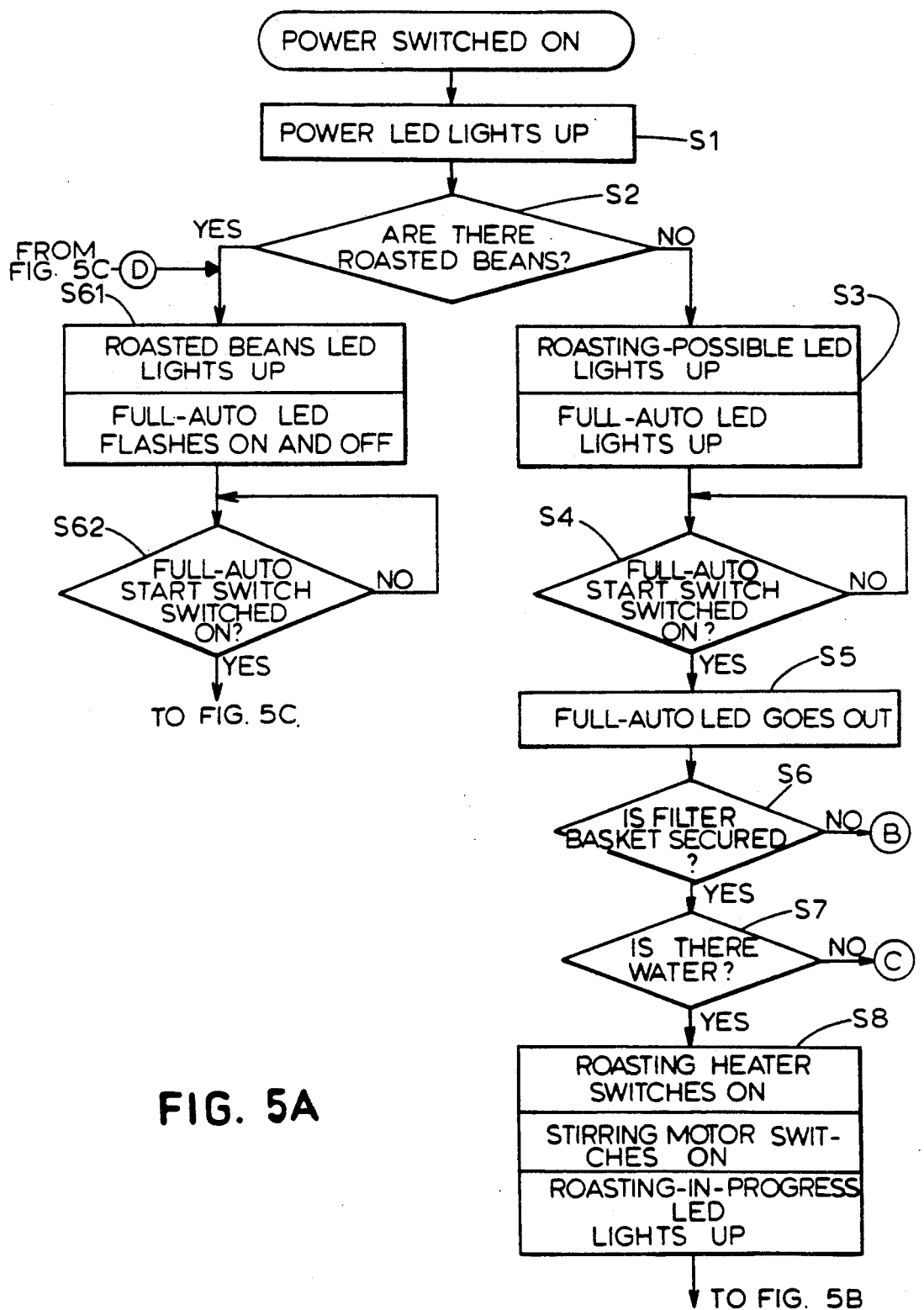
FIGS. 5A, 5B and 5C are three parts of a flowchart showing the control operations of the microcomputer, the three parts being connected as shown in these figures to form a single flowchart.
Figure 5B:
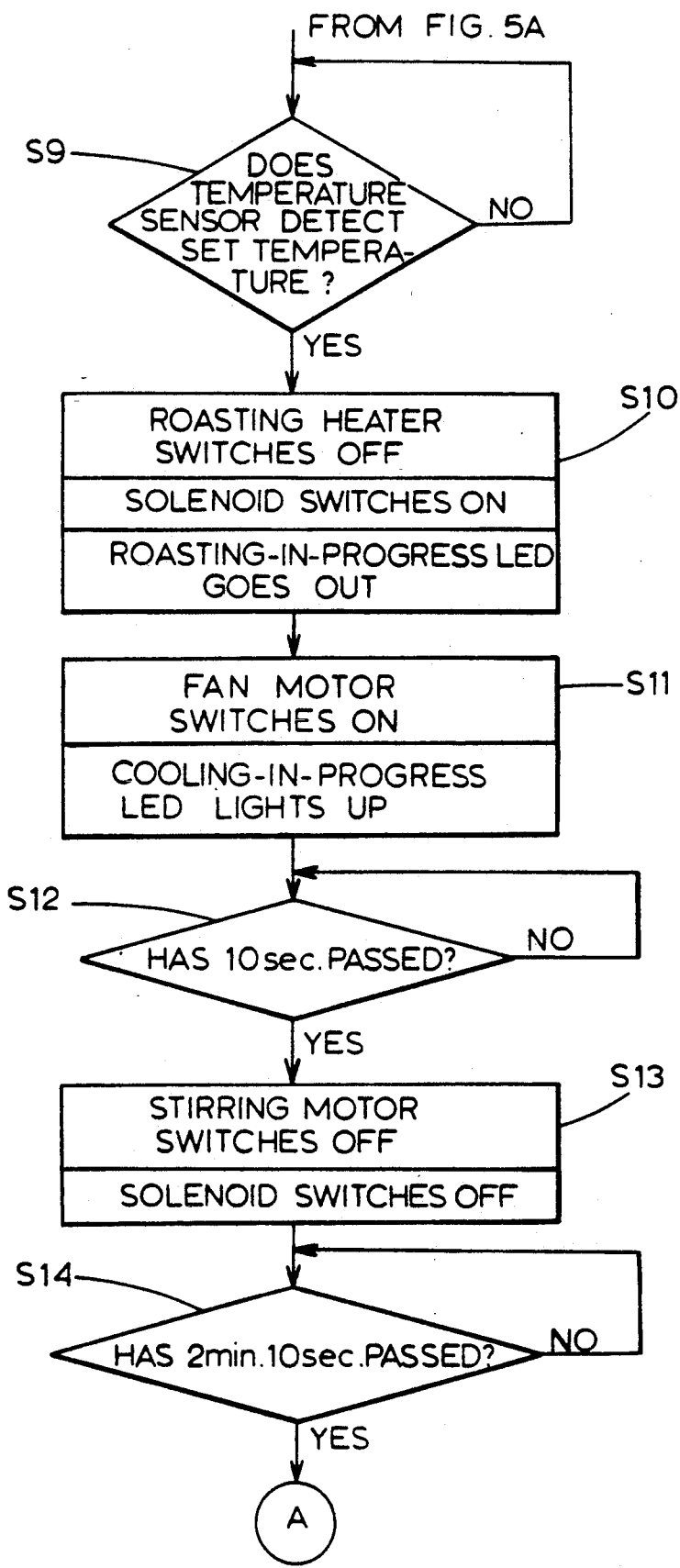
Figure 5C:
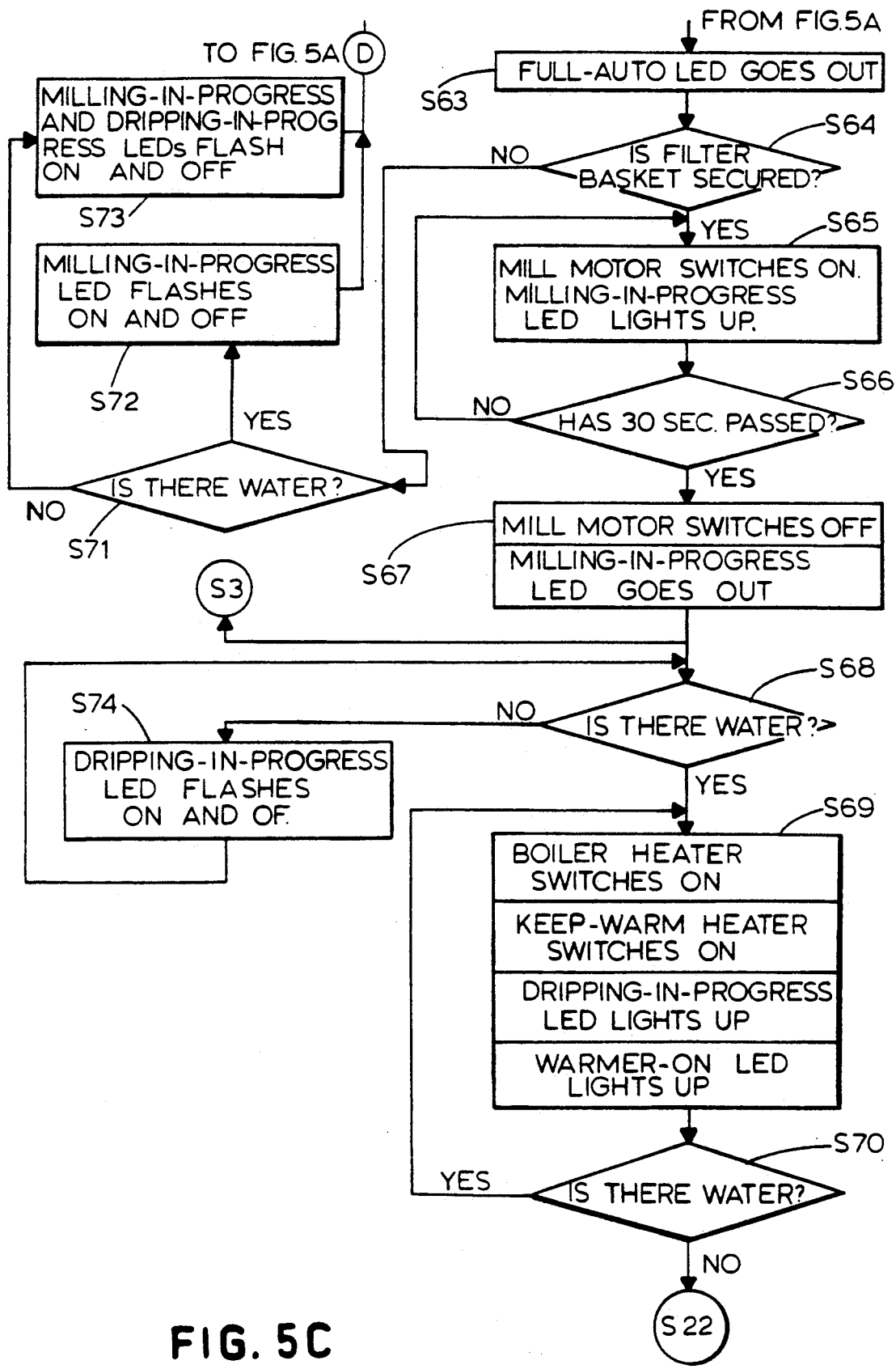
Figure 6A:
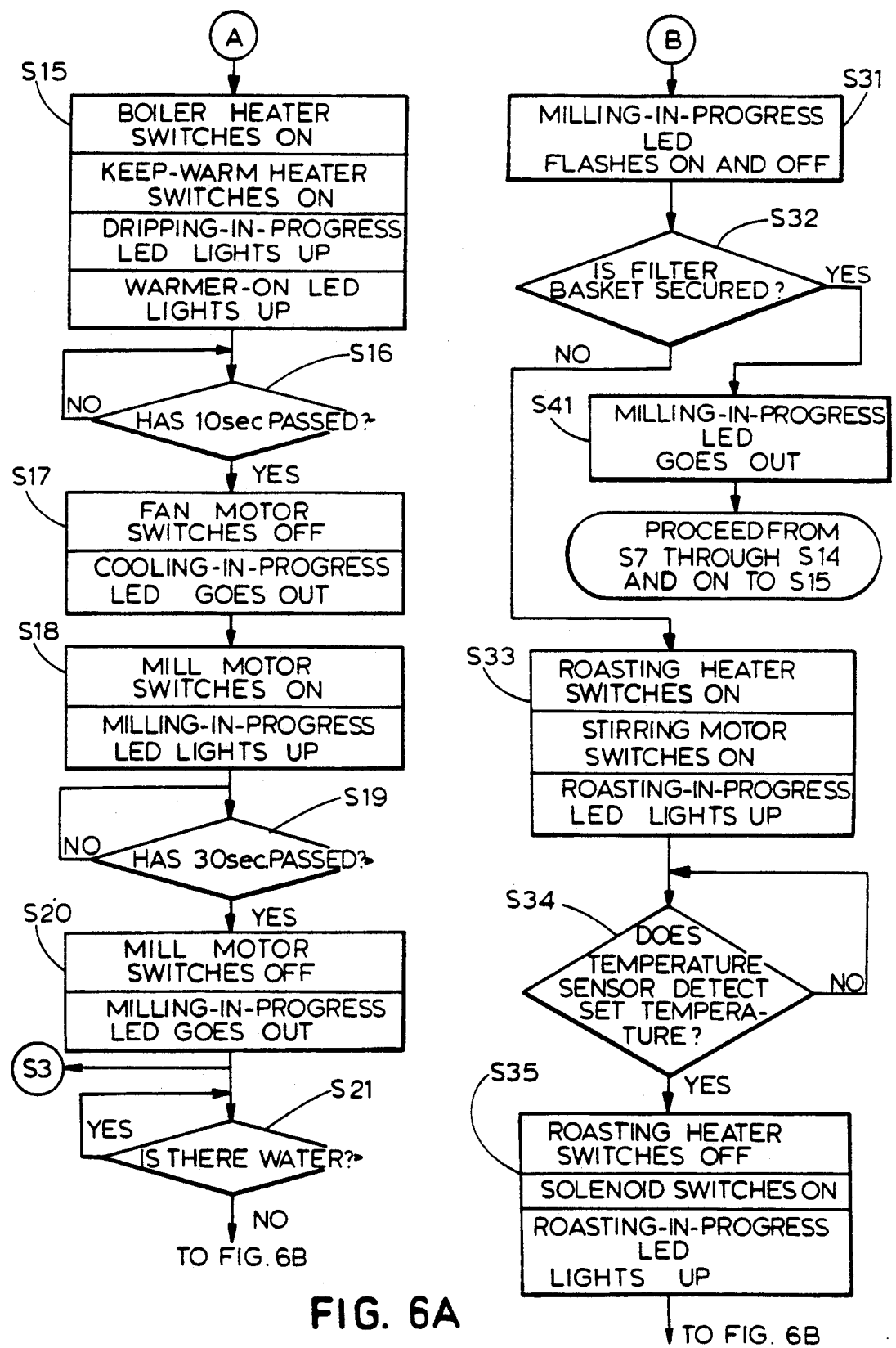
FIGS. 6A, 6B and 6C are three parts of another flowchart showing the control operations of the microcomputer, the three parts being connected as shown in these three figures to form a single flowchart.
Figure 6B:
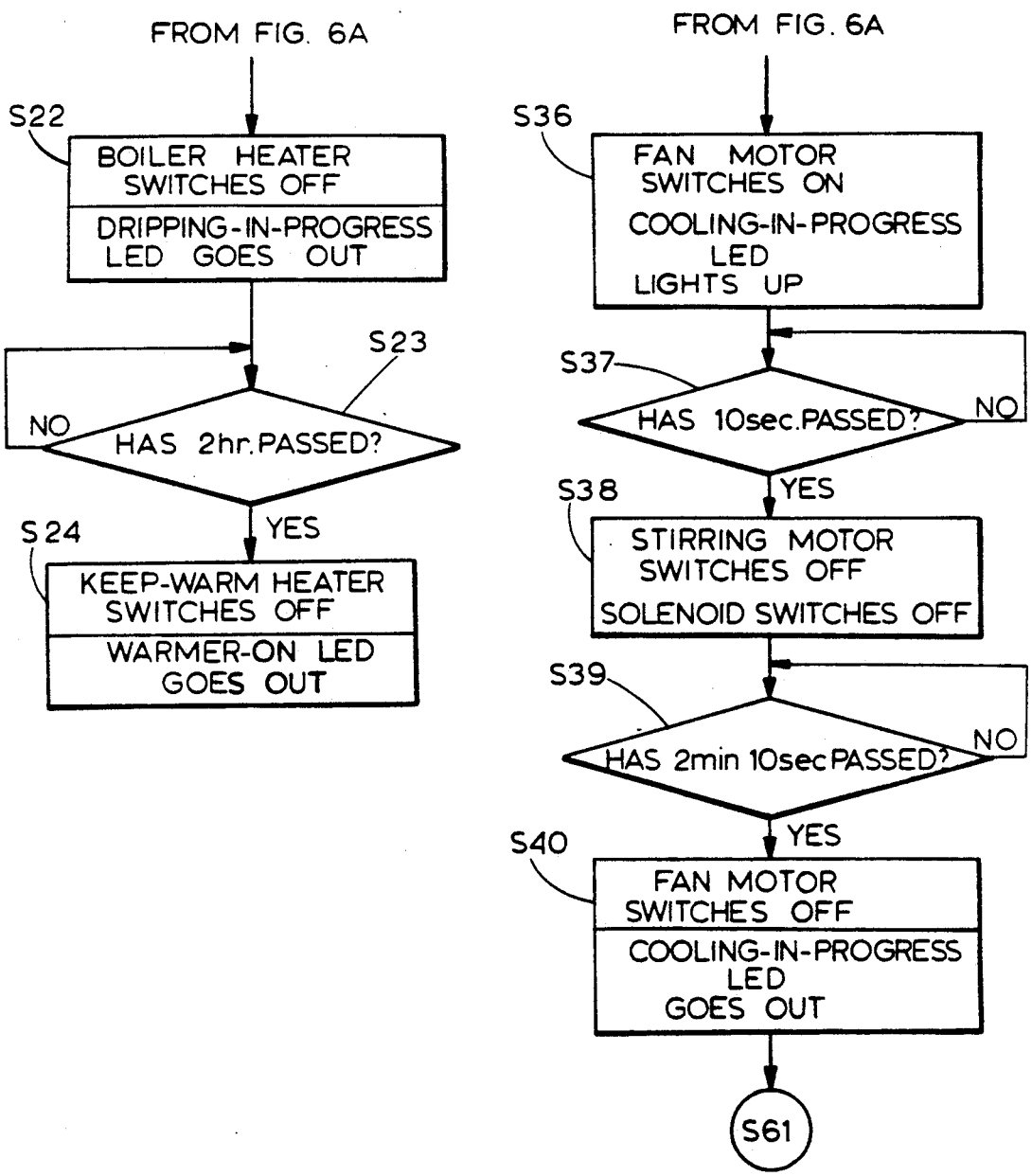
Figure 6C:
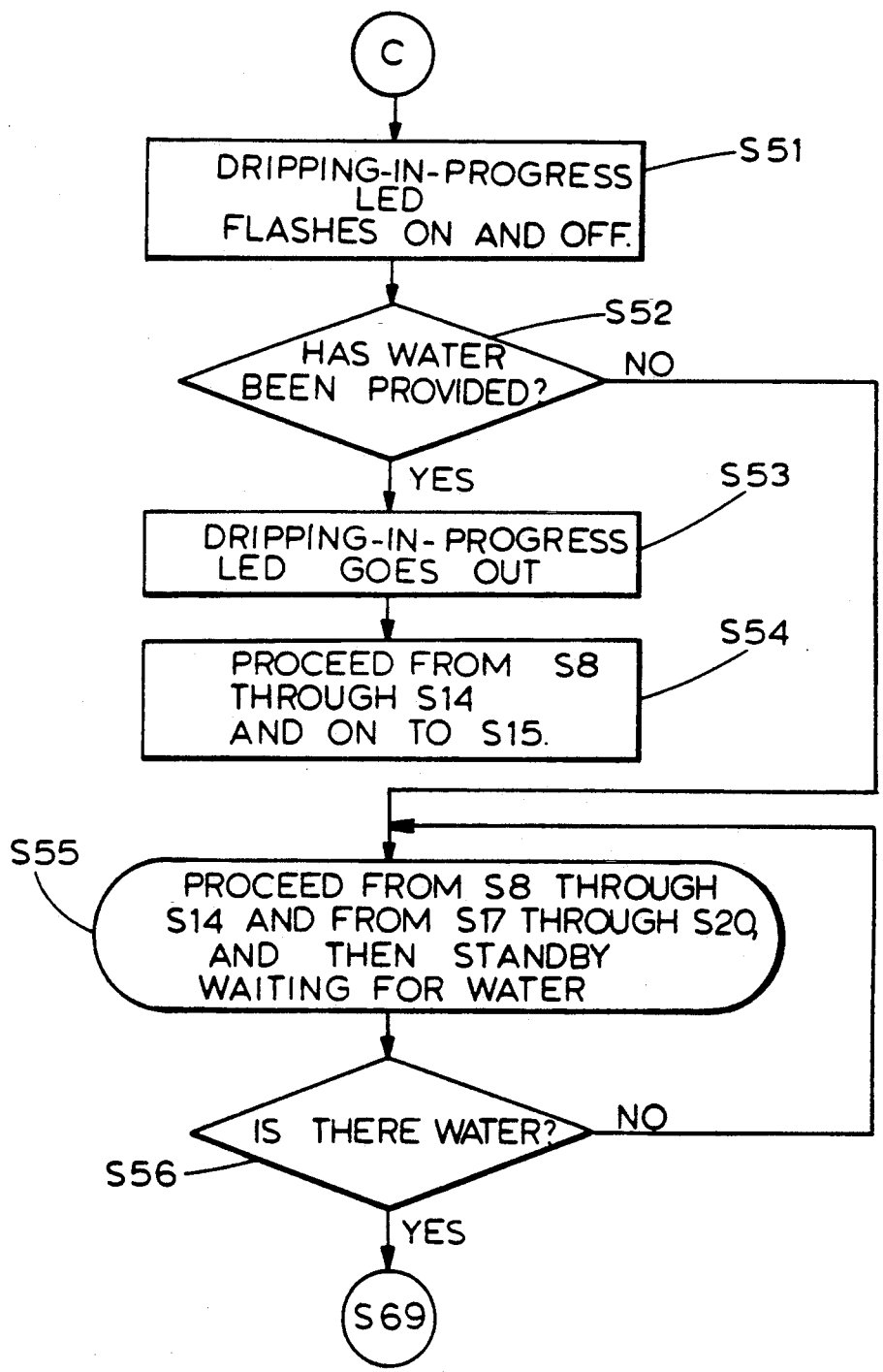

The following is a description of an example of the automatic control executed by the controller 80, with its built-in microcomputer 81, following the flow charts in FIGS. 5 and 6. First, when the power switch 91 is switched on, the power LED 92 lights up (step S1). Then, the controller 80 uses the remaining coffee beans detection sensor 24 to judge whether or not there are coffee beans in the temporary holding tank 22 (S2). If there are no beans, the roasting-possible LED 97 lights up and the full-auto LED 94 also lights up (S3), thus indicating that the first automatic operation, starting from the roasting of coffee beans by the roaster 10, is possible. On the other hand, if there are coffee beans in the temporary holding tank 22, the roasted-beans LED 100 lights up and the full auto LED 94 flashes on and off (S61), thus indicating that the second automatic operation, starting from the grinding of the coffee beans by the grinder 30, is possible. Following the operational flow from S2 to S3, when the full-auto start switch 93 is switched on (S4), the controller 80 begins the first automatic operation. Following the operational flow from S2 to S61, when the full-auto start switch 93 is switched on (S62), the controller 80 begins the second automatic operation.

When the first automatic operation is begun, first, the full-auto LED 94 goes out (S5), the filter basket detection sensor 71 detects whether or not the filter basket 2 is secured in position (S6), and then, if the tank-empty sensor 42 detects that there is water in the water tank 40 (S7), the roasting heater 13 is switched on, the stirring motor 18 is switched on, and the roasting-in-progress LED 101 lights up (S8). This causes roasting to begin. Then, when the temperature sensor 17 detects the predetermined temperature (S9), the roasting heater 13 is switched off, the solenoid 16 is switched on, and the roasting in-progress LED 101 goes out (S10). When roasting is completed, the beans are discharged from the roasting container 11 into the temporary holding tank 22. The blower 23 is then switched on, and the cooling-in-progress LED 102 lights up (S11). Ten seconds after the start of S11, the stirring motor 18 is switched off and the solenoid 16 is also switched off (S12 and S13). Then, when approximately 2 minutes and 10 seconds have passed (S14) after the start of S13, the heater 51 of the boiler 50 is switched on, the keep-warm heater 73 is switched on, the dripping-in-progress LED 104 lights up and the warmer-on LED 105 also lights up (S15). The timing for the starting of the operation of the boiler 50 is set slightly early in order to ensure the smooth supply of the heated water during the brewing step following grinding. When 10 seconds have passed (S16)

after the start of S15 the blower 23 is switched off and the cooling-in-progress LED 102 goes out (S17). The total cooling time is approximately 2 minutes and 30 seconds. The drop shutter 25 of the temporary holding tank 22 then opens, the mill motor 32 is switched on, and the milling-in-progress LED 103 lights up (S18). After grinding is carried out for about 30 seconds (S19), the mill motor 32 is switched off, the milling-in-progress LED 103 goes out, and grinding is stopped (S20).

At the completion of grinding, the roasting-possible LED 97 lights up and the full-auto LED 94 also lights up. In other words, the operational flow branches back to S3, and it becomes possible to begin the next first automatic operation or subprocess.

When the grinding at S18 begins, while the ground coffee powder is being successively supplied through the drop-supply opening 61 into the filter basket 2, the heated water is supplied through the hot water drop-supply openings 62, beginning just slightly later than the start of the drop-supply of the ground coffee, and thus dripping begins. Then, when the tank-empty sensor 42 detects that there is no more water in the water tank 40 (S21), the heater 51 of the boiler 50 is switched off and the dripping-in-progress LED 104 goes out (S22). After 2 hours have passed (S23), the keep-warm heater 73 is switched off and the warmer-on LED 105 goes out (S24).

During the first automatic operation, if it is detected that the filter basket 2 is not secured in position at S6, the milling-in-progress LED 103 will flash on and off (S31) in order to indicate that the filter basket 2 is not secured in position and also that, in this state, operation will not proceed to the grinding step. If the filter basket 2 is not subsequently secured in position (S32), operation will end with only the roasting step and the cooling step having been completed, the roasted-beans LED 100 will light up, and the full-auto LED 94 will flash on and off, thus indicating that the second automatic operation or subprocess, which starts from the grinding of the roasted coffee beans by the grinder 30, is possible. In other words, even if the filter basket 2 is not secured in position (S32), the roasting heater 13 will be switched on, the stirring motor 18 will be switched on, the roasting-in-progress LED 101 will light up (S33), and roasting will begin. Then, when the temperature sensor 17 detects the predetermined temperature (S34), the roasting heater 13 is switched off, the solenoid 16 is switched on, the roasting-in-progress LED 101 goes out (S35), roasting is stopped and the beans are discharged into the temporary holding tank 22, and then the blower 23 is switched on, the cooling-in-progress LED 102 lights up (S36), and cooling begins. After 10 seconds have passed (S37), the stirring motor 18 is switched off, the solenoid 16 is also switched off (S38), and then, after another approximately 2 minutes and 20 seconds have passed (S39), the blower 23 is switched off, the cooling-in-progress LED 102 goes out (S40), and the first automatic operation or subprocess is stopped partway through its flow. At this time the S61 indication will be displayed on the control panel 90 in order to indicate that the second automatic operation or subprocess is possible.

At S32, if the filter basket 2 has been secured in position at some stage along the way (by the time that the operational flow has proceeded from S7 to S14), the milling-in-progress LED 103 will go out (S41) and the operational flow will proceed from S7 through S14 and on to S15.

During the first automatic operation, if it is detected that there is no water in the water tank 40 at S7, the dripping-in-progress LED 104 will flash on and off (S51) in order to indicate that there is no water and also that dripping is not possible. Then, if the water tank 40 is provided with water (S52) at some stage along the way (by the time that the operational flow has proceeded from S8 to S14), the dripping-in-progress LED 104 will go out (S53) and the operational flow will proceed from S8 through S14 and on to S15 (S54). If the water tank 40 is not provided with water at some stage along the way (by the time that the operational flow has proceeded from S8 to S14), the operational flow will proceed from S8 through S14, and from S17 through S20, and the coffee maker will then wait in a standby state with the ground coffee beans having been supplied to the filter basket 2 (S55). Then, when the water tank 40 is subsequently provided with water (S56), the operational flow will proceed to S69, which will be described later, the heated water will be supplied, and the coffee will be brewed.

When the second automatic operation or subprocess is begun (S62), first, the full-auto LED 94 goes out (S63), and, if the filter basket detection sensor 71 detects that the filter basket 2 is secured in position (S64), the drop shutter 25 of the temporary holding tank 22 opens, the mill motor 32 is switched on, the milling-in-progress LED 103 lights up, and grinding begins (S65). The ground coffee beans are drop-supplied into the filter basket 2. Then, after 30 seconds have passed (S66), the mill motor 32 is switched off, the milling-in-progress LED 103 goes out (S67), and grinding is stopped.

When grinding is completed, the roasting possible LED 97 lights up, and the full-auto LED 94 also lights up (S3), thus indicating that the first automatic operation is possible. Of course, the original operational flow continues, and when water is detected in the water tank 40 (S68), the heater 51 of the boiler 50 is switched on, the keep-warm heater 73 is switched on, the dripping-in-progress LED 104 lights up, the warmer-on LED 105 lights up (S69), and the brewing and keeping-warm of the coffee begin. Then, when there is no more water in the water tank 40 (S70), the operational flow proceeds to S22, the heater 51 of the boiler 50 is switched off, the dripping-in-progress LED 104 goes out, and brewing is stopped. Then, after 2 hours have passed, the keep warm operation is stopped (S24).

During the second automatic operation or subprocess, if it is detected that the filter basket 2 is not secured in position at S64, it is determined whether or not there is water in the water tank 40 (S71), and, if there is water, the milling-in-progress LED 103 flashes on and off (S72) in order to indicate that the filter basket 2 is not secured in position and that grinding is not possible in this state. If there is no water, the milling-in-progress LED 103 and the dripping-in-progress LED 104 will both flash on and off (S73), thus indicating that there is no water and also that the filter basket 2 is not secured in position.

In addition, during the second automatic operation, if it is detected that there is no water at S68, the dripping-in-progress LED 104 will flash on and off (S74) and the coffee maker will then wait in a standby state until the water tank 40 is provided with water.

It should be noted that, although in the embodiment explained above, the point at which the mill motor 32 was switched off is used as the point at which it becomes possible to re-start the first automatic operation or subprocess starting from the roasting step, it is also possible to use some point prior to the switching off of the mill motor 32, as long as it is after the point at which the coffee bean drop shutter 25 of the temporary holding tank 22 opens and the mill motor 32 is switched on and begins grinding.

With the coffee maker as described and claimed herein having the composition described above, in a coffee maker capable of performing all of the steps from the roasting of the raw coffee beans to the brewing of the coffee completely automatically, because the temporary holding and cooling means is provided with a sensor for detecting remaining coffee beans and also because the controller is composed so that it begins the first automatic subprocess operation starting from the roasting of the raw coffee beans by the roaster if this sensor for detecting remaining coffee beans does not detect any coffee beans, and also so that it begins the second automatic subprocess operation starting from the grinding of the beans by the grinding means if coffee beans are detected, the coffee maker is capable of using its own judgement to reliably execute the appropriate automatic subprocess operation, either automatic operation starting from the roasting step or automatic operation starting from the grinding step, in accordance with whether or not there are coffee beans.

In addition, because the controller is composed so that, when coffee beans are detected by the sensor for detecting remaining coffee beans, the controller displays on the control panel an indication that there are roasted beans in the coffee maker and an indication that the second automatic operation is possible, and also so that, when coffee beans are not detected, it displays on the control panel an indication that roasting is possible and an indication that the first automatic operation is possible, in addition to the advantages described above, the user is informed whether or not there are coffee beans and which type of automatic operation is possible, and, as a result, these indications provide the user with information concerning the present condition and subsequent operation of the coffee maker, thus making the coffee maker extremely easy to use.

In addition, because the controller is composed so that it becomes possible to re-start the first automatic subprocess operation immediately following the start of the grinding of the roasted coffee beans by the grinding means, in addition to the advantages described above, it becomes possible to re-start the first automatic subprocess operation immediately following the start of the grinding of the roasted coffee beans by the grinding means. As a result, it is possible to simultaneously perform at least the brewing of the coffee and the roasting of the raw coffee beans to be used next, thus making it possible to obtain brewed coffee from raw coffee beans with good operational efficiency.

In addition, because the brewing means is freely detachable from the apparatus and a brewing means detection sensor is provided to detect whether or not the brewing means is secured in position and, furthermore, because the controller is composed so that the grinding means will not begin operation if this brewing means detection sensor detects that the brewing means is not secured in position, in addition to the advantages described above, it is possible to prevent the coffee beans from being ground and supplied while the preparation of the brewing means has not been completed.

In addition, because a tank-empty sensor is provided to detect whether or not there is water in the water tank and, furthermore, because the controller is composed so that the heater of the water heating and supply means will not be switched on if this tank-empty sensor detects that there is no water in the water tank, in addition to the advantages described above, empty or waterless heating is prevented, and, in addition, heating is reliably stopped when the supply of the hot water has been completed, thus ensuring safety.

The disclosures of K. Enomoto patent application Ser. No. 07/986,111 filed Dec. 4, 1992 and titled "Coffee Maker"; application Ser. No. 07/986,113 filed Dec. 4, 1992 and titled "Small-Capacity Coffee Roaster"; application Ser. No. 07/984,114 filed Dec. 4, 1992 and titled, "Coffee Maker"; and application Ser. No. 07/986,593 filed simultaneously herewith and titled "Coffee Maker," are incorporated herein by reference.

What is claimed is:

1. An automatic coffee maker comprising an outer case, a roaster mounted in said outer case for roasting raw coffee beans, a temporary holding and cooling means mounted in said outer case and located to receive coffee beans from said roaster for temporarily holding and fan cooling the coffee beans roasted by said roaster, grinding means mounted in said outer case and located to receive coffee beans from said holding and cooling means for grinding the beans removed from said holding and cooling means and supplying ground coffee, a water tank connected to said outer case, water heating and supply means mounted in said outer case and connected to receive water from said water tank for heating and supplying the water, brewing means mounted in said case and connected to receive the ground coffee beans ground by said grinding means and the hot water from said water heating and supply means for brewing the coffee, and a microcomputer equipped controller for controlling all of the steps from the roasting of the raw coffee beans to the brewing of the coffee completely automatically, said holding and cooling means further comprising sensor means for detecting coffee beans therein, said controller being connected to said sensor means, to said roaster, and to said grinding means and being operable to begin a first automatic subprocess operation starting from the roasting of the raw coffee beans by said roaster if said sensor means does not detect any coffee beans and to begin a second automatic subprocess operation starting from the grinding of the beans by said grinding means if coffee beans are detected by said sensor means.

2. A coffee maker as described in claim 1, and further comprising a control panel including indicators, said controller being connected to said indicators and being operable such that, when coffee beans are detected by said sensor means, said controller displays on said indicators that there are roasted beans and that said second automatic subprocess operation is possible, and also such that, when coffee beans are not detected by said sensor means, said controller displays on said indicators that roasting is possible and that said first automatic subprocess operation is possible.

3. A coffee maker as described in claim 1 or 2, wherein said controller is operable to re-start said first automatic subprocess operation immediately following the start of the grinding of the roasted coffee beans by said grinding means.

4. A coffee maker as described in claim 1 or 2, wherein said brewing means is freely detachable from said outer case, and a brewing means detection sensor is provided for detecting whether or not said brewing means is secured in position in said outer case, and said controller is operable such that said grinding means will not begin operation if said brewing means detection sensor detects that said brewing means is not secured in position.

5. A coffee maker as described in claim 1 or 2, wherein a tank-empty sensor is provided for detecting whether or not there is water in said water tank and said controller is operable such that a heater of said water heating and supply means will not be switched on if said tank-empty sensor detects that there is no water in said water tank.

* * * * *